Patented Aug. 4, 1925.

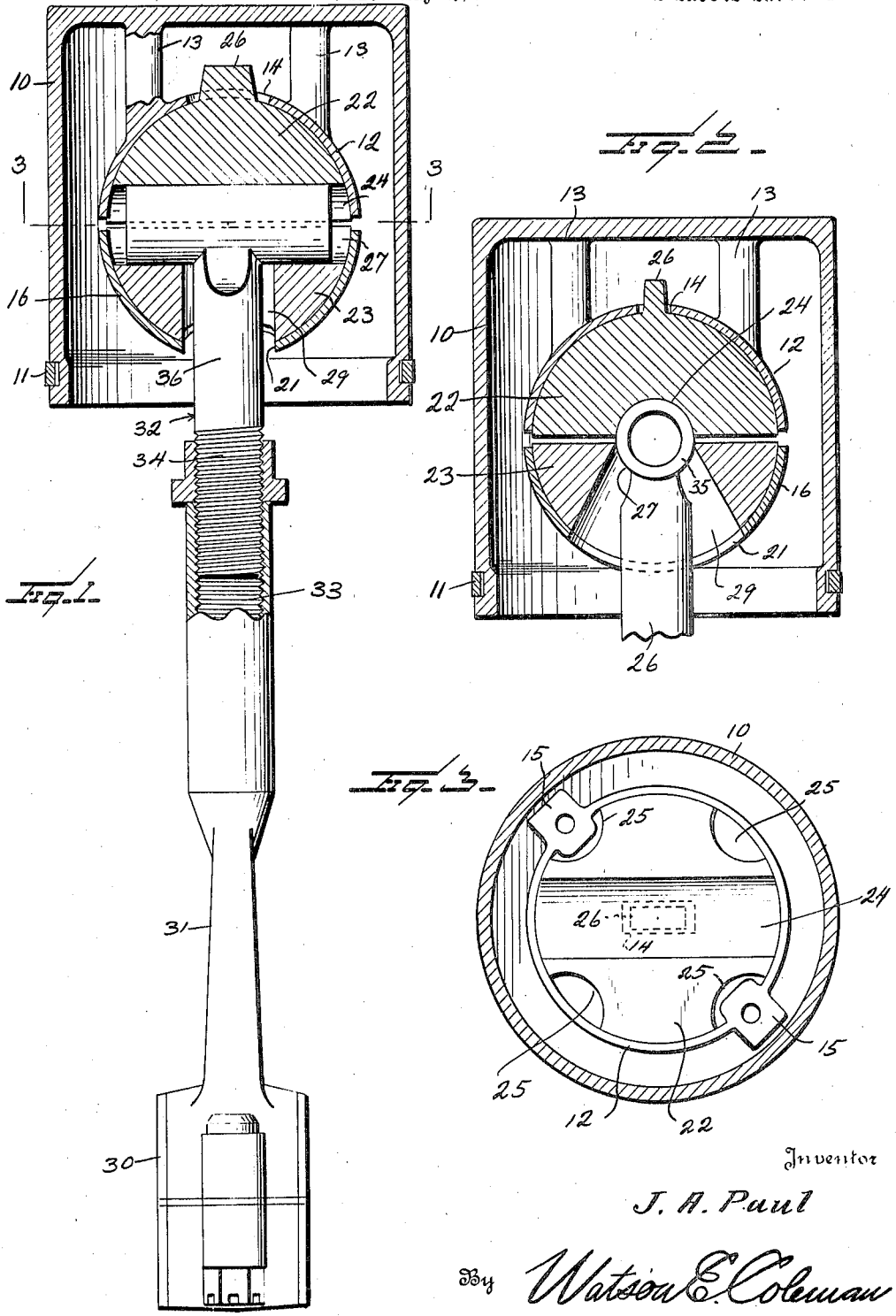

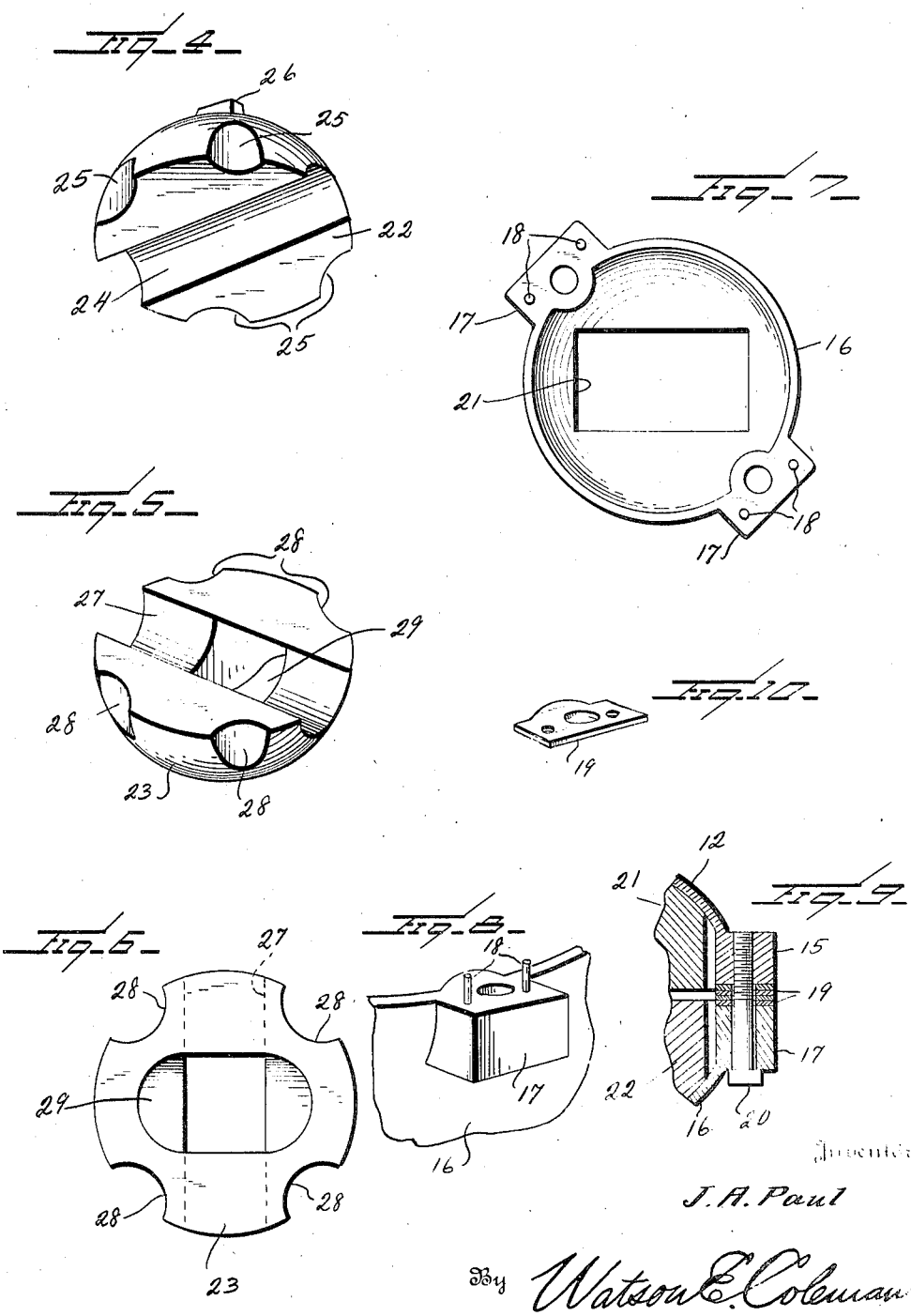

1,548,382

UNITED STATES PATENT OFFICE.

JOSEPH A. PAUL, OF WAPATO, WASHINGTON.

PISTON AND CONNECTING-ROD CONSTRUCTION.

Application filed May 27, 1924. Serial No. 716,237.

*To all whom it may concern:*

Be it known that I, JOSEPH A. PAUL, a citizen of the United States, residing at Wapato, in the county of Yakima and State of Washington, have invented certain new and useful Improvements in Piston and Connecting-Rod Constructions, of which the following is a specification, reference being had to the accompanying drawings.

This invention relates to piston and connecting rod construction and more particularly to an improvement in the manner of attaching connecting rods and pistons one with the other.

An important object of the invention is to provide a construction of this character which permits proper alignment of the piston with the cylinder regardless of slight misalignment with the cylinder of the crank of the crank shaft which is connected to the piston by the connecting rod.

A further object of the invention is to provide a device of this character which may be readily adjusted from time to time to compensate for wear.

A further object of the invention is the provision of a bearing carried by the piston which is engaged by a wrist pin carried by the connecting rod, the connection of the bearing to the piston being such that the bearing may oscillate slightly, and the connection of the connecting rod to the bearing being such that the connecting rod can shift transversely of the cylinder or longitudinally of the crank shaft in the bearing.

A still further object of the invention is the provision of a device of this character which may be readily and cheaply produced and which will be durable and efficient in service.

These and other objects I attain by the construction shown in the accompanying drawings, wherein for the purpose of illustration is shown a preferred embodiment of my invention and wherein:—

Figure 1 is a vertical sectional view through a piston and connecting rod constructed in accordance with my invention, parts of the lower end of the connecting rod being shown in elevation;

Figure 2 is a section through the piston at right angles to that shown in Figure 1;

Figure 3 is a section on the line 3—3 of Figure 1;

Figure 4 is a perspective of the upper sphere section;

Figure 5 is a perspective of the lower sphere section;

Figure 6 is a plan view of the lower sphere section;

Figure 7 is a top plan view of the lower bearing section;

Figure 8 is a perspective view of one side of the lower bearing section;

Figure 9 is a fragmentary sectional view through the bearing sections at the lugs thereof;

Figure 10 is a perspective of the type of shim employed.

Referring now more particularly to the drawings, the numeral 10 generally designates a piston which in actual construction may be made so that it closely fits the walls of the cylinder in which it is to operate, eliminating the necessity for the use of more than a single ring 11, as indicated, this ring being preferably located adjacent the lower end of the piston. Arranged in the upper end of the piston is a substantially semicircular bearing 12 supported from the upper wall of the piston by wings or pillars 13 integral with the bearing 12 and piston 10, so that these may be formed of a single casting if so desired. This bearing has formed in its upper portion an opening 14 located at the vertical axis of the bearing and piston the purpose of which will hereinafter appear. The lower edge of the bearing is terminated somewhat short of a true hemisphere and is provided at diametrically opposed points with lugs 15 extending into the hollow center of the sphere a short distance. Associated with the bearing section 12 is a similar bearing section 16 having corresponding lugs 17. One of the lugs is provided with vertically projecting pins 18 forming aligning guides for shims 19 placed on the lugs to maintain them in separated relation. Through the lug 17 of the lower bearing a headed screw-threaded element is directed, these members being rotatable in the lug 17 and having threaded engagement in the lugs 15 to hold the bearing sections 12 and 16 in assembled relation. The bearing section 16 has an axially disposed opening 21 which is elongated diametrically of the bearing section for a purpose presently to appear.

Mounted within the bearing sections 12 and 16 is a sphere composed of two semi-spherical sections 22 and 23, the former being hereinafter referred to as the upper section and the latter as the lower section. The upper section 22 has formed in the lower face thereof a diametrically extending semicircular groove 24 and has formed in its side walls at diametrically opposed points, pairs of notches 25 for the reception of the lugs 15 of the upper bearing section 12. These pairs of notches 25 are so arranged that when any pair of notches is engaged with the lugs 15 and the bearing section 12, the semicircular groove 24 of the hemisphere 22 extends in the same direction transversely of the piston 10. This upper section is provided with an axle lug 26 upon its upper end which projects into the opening 14 of the bearing section 12, this lug being of less size than the opening so that it has play therein and will permit a limited oscillation of the hemisphere 22 in the bearing section 12. For the same reason the notches 25 are made larger than the lugs 15 which they accommodate.

The lower bearing section 23 is similar to the section 22, being provided in its upper surface with a semicircular groove 27 which combines with the groove 24 to provide a circular bore through the sphere formed by the combination of the two sections 22 and 23. This section has also notches 28 corresponding to the notches 25 receiving, in this instance, the lugs 17 of the lower bearing section 16. Through the section 23 at the lower end of the groove an opening 29 is formed placing the opening 21 of the bearing section 16 in communication with the bore formed by the combination of the grooves 24 and 27. This opening 29 and the opening 21 are elongated diametrically of the bearing 16 in a plane at right angles to this bore. The connecting rod employed has at its lower end the usual bearing 30 for engagement with the throw of the crank shaft (not herein illustrated) but has its rod portion proper formed in two sections 31 and 32. The lower section 31 has its upper end tubular and interiorly threaded as at 33. The upper section is in the form of a T the stem of which is threaded, as at 34, for engagement in the threads of the tubular upper end of the section 31 and the head 35 of which is of a size snugly fitting the bore formed by the combination of the grooves 24 and 27. This stem is made of a length less than the diameter of the sphere formed by the combination of the sections 22 and 23 and accordingly of a length less than the internal diameter of the bearing carried by the piston 10. The stem 36 of this section is of less width than the openings 29 and 21 so that side play of the stem is permitted, thus permitting side movement of the piston 10 upon the head 35 so that the axis of the piston is offset from the normal axis as defined by the connecting rod when applied to the crank shaft.

It will be obvious that when a piston of this type is assembled and placed in position in the cylinder, the combination of movements of which the piston is capable will permit the piston at all times to conform to the cylinder walls in which it is operated even though the bore be slightly crooked as well as offset with respect to the throw of the crank shaft to which its connecting rod is applied. In this event a combination of movements will be effected, the bearing sections 22 and 23 oscillating slightly in the bearings 12 and 16 to compensate for the angularity of the bore, while the head 35 moves transversely in the bearing sections 22 and 23 to permit proper alignment of the piston to compensate for the offset of the crank shaft. It will furthermore be obvious that at any time if wear upon the spherical sections 22 and 23 by the head 35 causes looseness of the head, this may be taken up by simply removing the screws 20, taking off shims and replacing the bearing sections, it being, of course, understood that the adjacent faces of the spherical sections 22 and 23 will be normally slightly spaced. This can be accomplished without removing the piston from the cylinder and accordingly in a much shorter space of time than is ordinarily necessary to make adjustments at this point.

Since the device as above described is capable of a certain range of change and modification without materially departing from the spirit of my invention, I do not limit myself to such specific structure as hereinbefore set forth except as hereinafter claimed.

I claim:—

1. A piston for an internal combustion engine provided interiorly with a sectional hollow spherical bearing, a sectional sphere mounted within the bearing and capable of a limited oscillation therein, the sections of the sphere combining to provide a circular bore directed transversely of the piston, the lower end of the sphere and bearing therefor being provided with openings through which a connecting rod may be connected, and a transverse head on said connecting rod mounted in the bore of the sphere, said head being of less length than said bore, the openings of the sphere and bearing for the reception of the connecting rod permitting movement of the connecting rod in a direction transverse of the piston and coinciding with the general direction of the bore of the sphere.

2. A piston for an internal combustion engine provided interiorly with a sectional hollow spherical bearing, a sectional sphere mounted within the bearing and capable of a limited oscillation therein, the sections of the sphere combining to provide a circular bore directed transversely of the piston, the lower end of the sphere and bearing therefor being provided with openings through which a connecting rod may be connected, and a transverse head on said connecting rod mounted in the bore of the sphere, said bearing having lugs projecting into the interior thereof, the outer face of the sections of said sphere having sockets loosely receiving said lugs and coacting therewith to limit the oscillation of the sphere within the bearing.

3. A piston for an internal combustion engine provided interiorly with a hollow spherical bearing formed in upper and lower separable sections, the upper section being integral with the piston, means for holding said sections in assembled relation a sectional sphere mounted within the bearing and capable of a limited oscillation therein, the sections of the sphere combining to provide a circular bore directed diametrically of the piston, the lower end of the sphere and bearing therefor being provided with openings, a connecting rod formed in two separable sections, the upper section being directed through said openings and having a transverse head mounted in the bore of the sphere, the sphere being formed in two semispherical sections, the upper section of the sphere having a lug extending into an opening formed in the upper section of the bearing to thereby limit the oscillation of the sphere.

In testimony whereof I hereunto affix my signature.

JOSEPH A. PAUL.